Dec. 30, 1958 B. LONG 2,866,299
METHOD FOR THE MANUFACTURE OF TEMPERED SAFETY GLASS
ESPECIALLY INTENDED FOR USE IN AUTOMOBILES
Filed Feb. 9, 1956 4 Sheets-Sheet 1

INVENTOR
Bernard Long
By Holcomb, Wetherill & Brisbois
ATTORNEYS

Dec. 30, 1958             B. LONG            2,866,299
METHOD FOR THE MANUFACTURE OF TEMPERED SAFETY GLASS
ESPECIALLY INTENDED FOR USE IN AUTOMOBILES
Filed Feb. 9, 1956                          4 Sheets-Sheet 2

INVENTOR
Bernard Long
By Holcomb, Velhoult&Dubois
ATTORNEYS

Dec. 30, 1958 B. LONG 2,866,299
METHOD FOR THE MANUFACTURE OF TEMPERED SAFETY GLASS
ESPECIALLY INTENDED FOR USE IN AUTOMOBILES
Filed Feb. 9, 1956 4 Sheets-Sheet 4
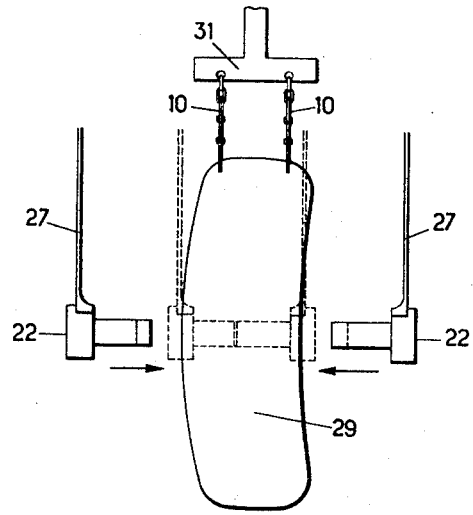
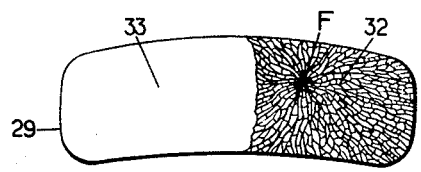
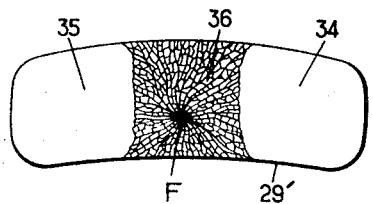
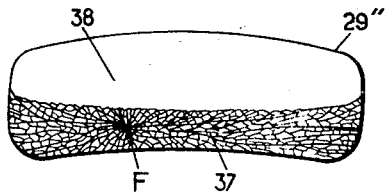
INVENTOR
Bernard Long
By
ATTORNEYS

United States Patent Office 2,866,299
Patented Dec. 30, 1958

2,866,299

METHOD FOR THE MANUFACTURE OF TEMPERED SAFETY GLASS ESPECIALLY INTENDED FOR USE IN AUTOMOBILES

Bernard Long, Paris, France, assignor to Compagnies Reunies des Glaces & Verres Speciaux du Nord de la France, Paris, France, a corporation of France Application February 9, 1956, Serial No. 564,543

Claims priority, application France February 14, 1955

5 Claims. (Cl. 49—89)

The invention relates to highly tempered sheets of safety glass having two or more zones, which are independent with regard to the propagation of cracks, separated by reserved zones which have been tempered to a different degree and have the property of stopping at their edges those cracks which originate outside their boundaries.

These reserved zones thus constitute barriers to the spreading of cracks and permit any crack which occurs to be limited to the single independent zone in which it originates.

It is well known that such highly tempered sheets of glass have been suggested as safety glass for automobiles. When used as windshields, they guarantee to the driver of the vehicle an adequate view of the road in the event cracks appear in the windshield, since the loss of transparency which results from the fragmentation of the highly tempered glass is then limited to the single zone containing the point at which the cracks originate.

It was at first suggested that the barriers to the spreading of the cracks serve as complete or partial common boundaries to zones independent with regard to the propagation of cracks, but it was soon realized that this method of construction was not as satisfactory as when the barriers closed on themselves. In other words, it was found from attempts at manufacture that transverse barriers running from one side of a sheet to the opposite side were usually ineffectual and also constituted zones which were highly sensitive to shock when they were formed by the prior art methods of creating such barriers.

This state of the art during the past few years is evidenced by the French Patent No. 1,038,439 filed June 15, 1951, issued May 6, 1953, describing a method of manufacturing highly tempered glass having reserved zones which are not tempered or only slightly tempered and which serve as barriers to the spreading of cracks. According to the method described in said French patent, each of the barrier zones is necessarily encircled by a tempered zone; obviously, this method precludes the production of any transverse barrier.

I have, however, in British Patent No. 726,626 filed July 22, 1953 and issued July 13, 1955, disclosed a process permitting the producition of barrier zones of any desired shape or size in a glass sheet or in tempered plate glass and especially barrier zones in the form of transverse strips running from one side of the sheet to the other, but experience has proven that the transverse barrier strips produced by this process do not constitute reliable barriers to the extension of cracks originating outside their boundaries. I have noticed that in many cases the cracks crossed the barriers by running along the edges of the transverse strips.

The principal object of my invention is to provide a process for creating barriers to the spreading of cracks in a highly tempered flat or curved sheet of glass, the barriers extending from one side of the sheet to the other and completely preventing the spreading of cracks along their edges.

In order that the references hereinafter made to various parts of the transverse strip may be clearly understood, these parts will now be defined with reference to Figure 1 of the drawings.

In Figure 1, the sheet 1, the two faces of which form the rectangles $A_1B_1C_1D_1$ and $A_2B_2C_2D_2$, consists of three parts; two principal zones 2 and 3, separated by a transverse barrier strip 4 of uniform width, running from one of the long sides of the sheet to the other.

This transverse strip has two principal surfaces, i. e. $a_1b_1c_1d_1$ and $a_2b_2c_2d_2$.

The sheet has two opposite longitudinal edges 5 forming the rectangles $A_1A_2D_2D_1$ and $B_1B_2C_2C_1$.

The edges 6 of the transverse strip are part of the side edges 5 and form the rectangles $a_1a_2d_2d_1$ and $b_1b_2c_2c_1$.

By "ends of the strip" is meant the parallelopipedal volumes 7, each volume 7 being contained between an edge 6 and a plane parallel to the edge at a short distance therefrom.

The hatched zone near the upper edge schematically represents what is meant by "the upper end of the strip" in the plane of the surface $a_1b_1c_1d_1$.

The "body" 8 of the transverse barrier strip is the portion of this strip which lies between its ends 7.

The "boundaries" between the transverse strip and the two zones 2 and 3, which it separates, form the rectangles $a_1b_1b_2a_2$ and $d_1c_1c_2d_2$.

The process constituting my invention consists of conducting the operations of heating and cooling each end of the transverse strip which is to become the barrier in such a manner as to place both of them under a permanent compression parallel to the edge of the sheet at which said end is located (first step); simultaneously the rest of the transverse strip is so treated that, at the boundaries between it and the two adjacent highly tempered zones, its entire thickness is under a permanent compression parallel to these boundaries (second step).

Said first step is the one which gives the transverse strip its ability to stop the spreading of cracks, in the sense that it rigorously prevents the extension of cracks along its sides.

This novel first step is the most important feature of the process which constitutes my invention; without this step it would be impossible to consistently produce barriers guaranteeing that cracks occurring in either of the two highly tempered zones will not spread to the opposite zone.

The second step, which is carried out conjointly with the first, prevents the cracks from breaking across the boundaries of the transverse strip at points intermediate its ends. This is the step to which applicant previously referred in British Patent No. 726,626 but it was therein described as the result of a particular method of operation.

The process constituting my invention is carried out by combining an entirely new method of treating the ends of the transverse barrier strip with particular steps which produce the known result, hitherto obtained in a different manner, of placing the boundaries between the transverse barrier strip and the two adjacent highly tempered zones under longitudinal (tangential) compression.

At the end of the operation of heating the sheet which precedes the tempering itself, the ends of the transverse strip, including its edges, are brought to a temperature lower than that of the rest of the transverse strip without, however, permitting this temperature to fall below the point at which the viscosity of the glass has a value of about $10^{13}$ poises, this last condition permitting the ends to be slightly tempered.

At the same time, the body of the transverse strip is brought to a temperature lower than that of the two zones of the sheet situated on oposite sides of the strip which are to be highly tempered, a temperature which is, however, no less than that at which the viscosity of the glass has a value of about $10^{13}$ poises, this last limitation permitting the body of the barrier strip to be slightly or moderately tempered.

Under these conditions, the tempering makes it possible to (1) place each of the ends of the transverse strip under compression parallel to the adjacent edge throughout its thickness and (2) place the boundaries of the transverse strip which adjoin the two highly tempered zones under longitudinal compression throughout their depth, which is the thickness of the sheet. This tempering may advantageously be performed in existing sheet glass treating furnaces by the use of screens to produce the results desired although my invention is not restricted to any particular type or form of apparatus.

The moderation of the heating of each end (both marginal and edge portions) as compared with the heating of the body of the transverse strip is brought about by means of a screen positioned over this end at a short distance therefrom.

The moderation of the heating of the body portion of the transverse strip, as compared with that of the two zones which it separates, results from the use of two screens positioned on opposite sides thereof at a short distance from and parallel to the surfaces of the sheet.

All of these screens are placed in position after the sheet has been introduced into the furnace. By working in this manner the glass is permitted to acquire a certain plasticity before creating therein certain warmer areas adjacent to cooler areas and I thus avoid the cracks due to expansion which would result if the glass were in its fragile state.

Screens of various types have already been used to moderate the heating of circular or annular areas isolated in the middle of a sheet, before carrying out the tempering step, but it should be emphasized that screens have never heretofore been employed which protect certain portions of the edges of the sheet.

The screens used to carry out the process constituting my invention may be made of metal or other materials having a substantial resistance to thermal shocks, for example, vitreous silica, sintered corundum, ceramic materials having a low thermal expansion (hard porcelains, special sandstones). It is certain that the metals are the most convenient material to use by reason of the facility with which they may be machined, their mechanical strength and their generally satisfactory behavior at the temperatures of the tempering furnaces.

Although it oxidizes easily, ordinary steel may serve satisfactorily; stainless steels are even better.

For a given material, the temperature moderating effect exerted by the screen is obviously a function of its thickness. This suggests that the temperatures of the various parts of the transverse strip may be regulated by varying the thickness of the different screens, assuming, of course, that these screens are put in place simultaneously.

Thus the screens for the ends of the transverse strip (that is for both the marginal portions and the edges) are thicker than those for the body of the transverse band. The latter are preferably thicker at their lateral parts than in their central areas.

Instead of varying the thickness of the screens themselves to create the temperature difference required to carry out the invention, it is possible to obtain the same result by attaching a heat insulating lining in front of the portions which it is necessary to bring to a lower temperature.

Other means may be employed to vary the protective effect of the screens.

One of the simplest consists of making the screens for the edges and those for the body of the transverse strip independent of each other, so that the putting in place of the latter may be delayed with respect to that of the former.

Another means consists in varying the absorption and emissive properties of the screens by employing an appropriate lining.

For example, it is possible to create substantial differences between the temperatures of various parts of the transverse strip by coating certain parts of the screen, which is made of a metal which oxidizes readily (such as iron or copper) with a layer of metal which oxidizes less readily (such as nickel, chrome, silver, gold or platinum).

Another example consists of modifying the emissivity of the lateral edges of the screen, which permits the variation of the temperature gradient in those portions of the highly tempered zones near their boundaries with the transverse strip.

In order to carry out the process constituting invention it is necessary to moderate the heating of the edges of the sheet at each end of the transverse strip with respect to the heating of the body portion of the strip and the heating of the highly tempered zones of the sheets.

This may be done along a distance equal to the width of the body of the transverse strip, but experience has indicated that the compresison of the ends is greatly facilitated, and a margin of safety is provided, by using end screens which extend beyond the width of the body of the transverse strip, thus in effect abruptly widening this barrier strip at each of its ends.

In order to simplify the mode of operation it is obviously advisable to bind the end screens to those which protect the body of the transverse strip in such a manner that only two screens need to be handled instead of four. For example, two screens may be used which meet in the plane of the sheet at a short distance from its edges. Alternatively, two U-shaped screens may be used which are placed so that they straddle the two opposite ends of the strip and meet at its central portion.

The two compound screens in question may be articulated, by means of simple rotation about horizontal axes, for example, so that the screens for the body portion of the transverse strip need not be turned down into position until a certain time after the edge screens have been put in place. This adds a useful method of regulating the temperature.

Assuming that there are only two screens to be positioned symmetrically with respect to the plane of the sheet, the operation is carried out as follows:

The sheet, suspended by means of the usual articulated pincers, having been introduced into the heating furnace, a sufficient time is allowed to elapse to permit the glass beneath the screen to acquire during the complete heating process a temperature such that its viscosity will be about $10^{13}$ poises, and the protective screens are then placed in position.

When the uncovered zones of the sheet have attained the degree of plasticity required for a high temper, the sheet is withdrawn from the furnace and rapidly cooled in a known manner (for example by means of blowing grilles symmetrically disposed on opposite sides of the sheet) which act on the screens which remain in place on the sheet as well as on the uncovered zones. After a short time the screens are removed and the cooler is permitted to act on the entire surface of the sheet until the cooling has been completed.

This mode of operation leads to the following result:

(a) The two zones not covered by the screens and between which the transverse barrier strip is located are highly tempered.

(b) The transverse barrier strip is slightly tempered at the same time that its ends are, throughout their thickness, placed under compresison parallel to its edges and its boundaries bordering the unprotected zones are, throughout its thickness, placed under longitudinal (tangential) compression.

The time which is allowed to pass before the screens are put in place is variable. For a given thickness of the sheet, this time depends on several factors, among the most important of which are:

The temperature to which the radiating elements of the furnace (the heated resistances and the refractory materials) are brought.

The arrangement of the screens (the nature of the materials of which they are composed, the nature of their surfaces, their thickness, etc.).

The degree of compression to be given to the ends of the transverse barrier strip.

The degree of temper to be given to the body of the transverse barrier strip at its different points.

To be specific, it may be stated that this time varies between 2 and 4 minutes for tempering furnaces of the type currently used in which the sheet remains in the furnace for between 4 and 5 minutes in order to attain a high temper.

The time after which the screens are removed during the cooling step is variable, since it is dependent upon the above-mentioned time and consequently upon the factors mentioned in connection therewith.

It should be remembered that, according to the invention, the temperature of the ends as well as the temperature of those portions of the transverse strip which are near these ends (the latter temperature being always greater than the former) must not fall below the temperature at which the viscosity of the glass has a value of about $10^{13}$ poises at the time when they are subjected in their turn to the tempering cooling, this state of viscosity ensuring that a certain temper may be imparted to the glass in these zones.

To be specific, it may be stated that transverse barriers have thus been obtained into which cracks originating from outside cannot enter and which have also a greater resistance to shock than an untempered sheet, by removing the screens after about 5 or 10 seconds, when they are made of ordinary steel, 8 mm. thick, lined on the face turned towards the glass with a layer of asbestos sheeting several millimeters thick.

In some cases, however, transverse barriers having the required properties are obtained by leaving the screens in place throughout the entire cooling step of the tempering process.

Satisfactory results have also been obtained by removing the screens as soon as the sheet leaves the tempering furnace.

It is obvious that the same sheet may have several transverse barriers or reserved strips produced in the manner hereinafter described, each of them separating two highly tempered zones.

In the case of a safety-glass windshield for an automobile, a single transverse barrier appears to be sufficient to give the driver an adequate area of unimpaired visibility through which to see the road. This barrier may be vertical or horizontal.

However, two transverse vertical barriers may be provided, separating the windshield into three highly tempered zones independent with regard to the propagation of cracks.

The creation of transverse barriers or reserved strips in sheets which have already been curved and which are to be subsequently tempered does not differ from the creation of such barriers in flat sheets.

Neither is there any essential difference in the process of creating the transverse barriers when, during the heating which precedes the tempering, the sheet moves (as in a continuous furnace or one having several working positions) instead of staying in the same place (as in a furnace having a single working position).

In order that the invention may be better understood, I will now, by referring to the second figure of the drawings, set forth the basic principles of my process; and describe, purely by way of example, and without limiting the scope of my invention thereto, several ways of carrying out my invention which are illustrated on the other figures of the attached drawings.

Figure 3:
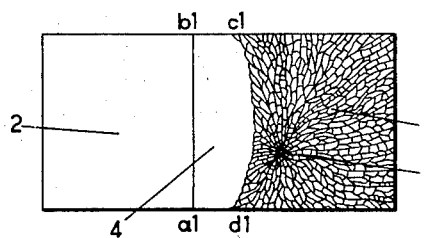
Figure 4:
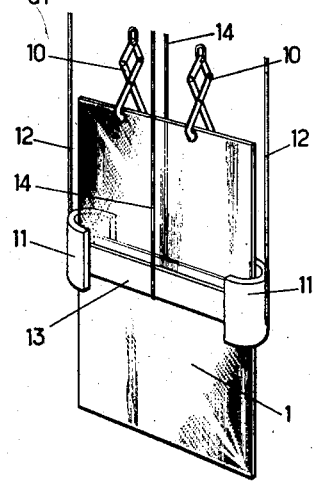
Figure 5:
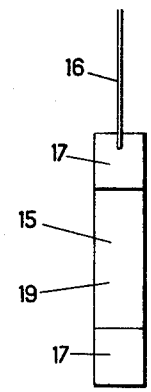
Figure 5A:
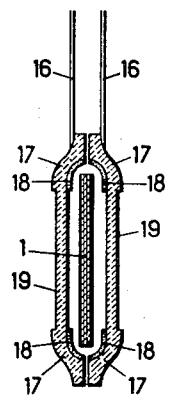
Figure 6:
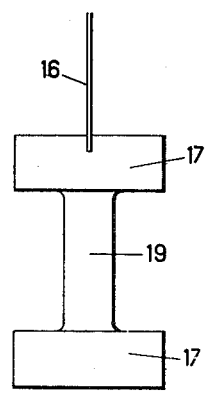
Figure 7:
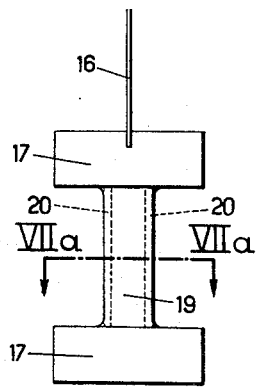
Figure 8:
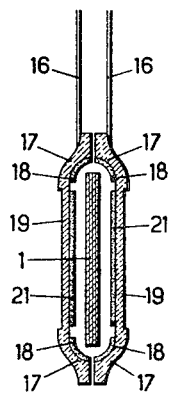
Figure 7A:
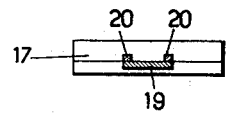
Figure 9:
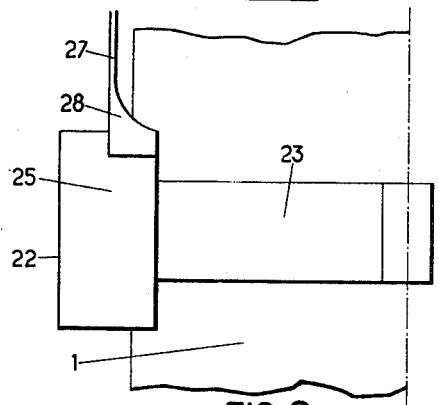
Figure 9A:
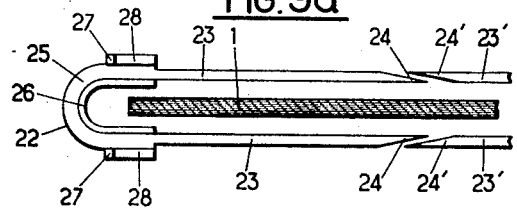
Figure 10:
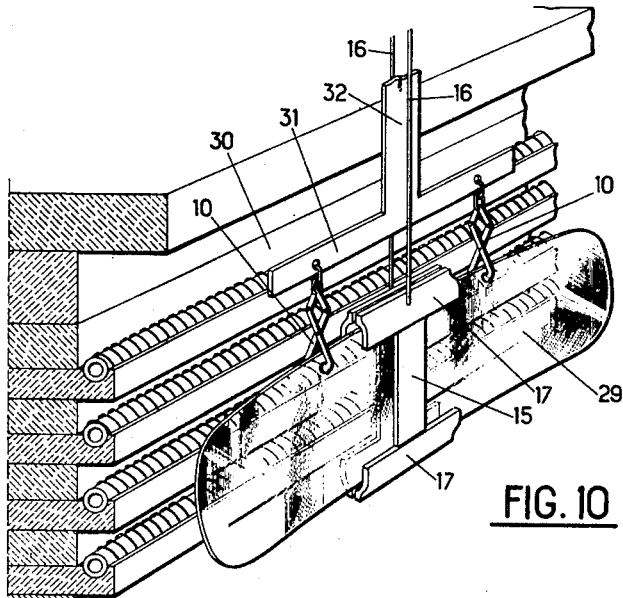

Figure 3 schematically illustrates the way in which the sheet cracks when the cracking is restricted to one of the two highly tempered zones;

Figure 4 is a perspective view showing the respective positions of the end screens and the body screens for the transverse barrier strip in the case in which the two types of screens are separate;

Figures 5 and 5a are an elevational view and a longitudinal cross-section showing a screen having ends which have not been enlarged;

Figure 6 is an elevational view showing a compound screen, the ends of which are wider than its intermediate portions;

Figures 7 and 7a show in elevation and in transverse cross-section a compound screen in which the portion intermediate its ends is thicker at the edges than at the center;

Figure 8 is a longitudinal cross-section showing a compound screen having an intermediate portion lined with asbestos board;

Figures 9 and 9a are side and plan views respectively showing a U-shaped screen designed to be placed so as to straddle the side edge of the sheet as held vertically and to cover the two faces of the transverse barrier strip up to half of its length;

Figure 10 is a perspective view of a windshield in the interior of an electric furnace for heating it before tempering, the windshield being suspended in a horizontal position and shielded on its vertical sides by two screens delimiting the area which will, after tempering, become a transverse vertical barrier along its transverse axis;

Figure 11 is an elevational view of a windshield horizontally straddled by two U-shaped screens of the type shown in Figures 9 and 9a;

Figure 12 shows how a windshield having two independent highly tempered zones which are separated by a transverse barrier along its transverse axis appears after the right-hand zone has been cracked by shock;

Figure 13 shows how a windshield with 3 independent highly tempered zones separated by two transverse vertical barriers looks after the middle zone has been cracked by shock; and Figure 14 shows how a windshield with two independent highly tempered zones, separated by a single transverse horizontal barrier, looks after the lower zone has been cracked by shock.

Figure 1:
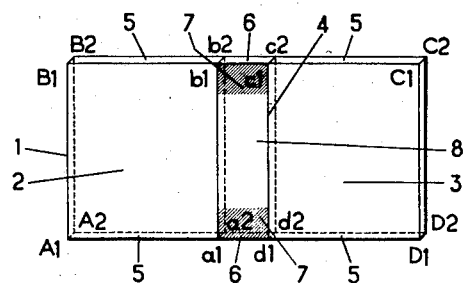
Figure 1 shows in perspective a rectangular sheet of glass having a rectangular transverse strip running from one of its sides to the other.
Figure 2:
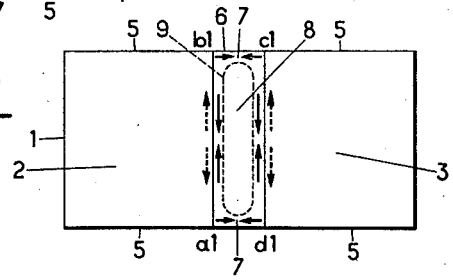
Figure 2 is a plan view of the said rectangular sheet after those stresses have been developed by means of the process constituting my invention, which are schematically indicated by means of the arrows, and which transform the strip into a transverse barrier separating two zones which are independent with regard to the propagation of cracks.

On Figure 2 the transverse barrier strip is represented by the rectangle $a_1b_1c_1d_1$. The sides $a_1b_1$ and $c_1d_1$ of this rectangle thus constitute the boundaries between the strip and the zones 2 and 3. The sides $a_1d_1$ and $b_1c_1$ constitute the edges.

The groups of two convergent arrows in solid lines indicate that the glass is under compression throughout the thickness of the sheet; the groups of two divergent arrows in broken lines indicate that the glass is under tension in the middle part of the thickness of the sheet.

The process constituting my invention places the ends 7 under compression parallel to the edges 6 of the transverse barrier strip.

This process also places the glass of the strip which is near the internal boundaries $a_1b_1$, $c_1d_1$ under compression so that as a result the entire peripheral zone contained between the rectangular contour $a_1b_1c_1d_1$ (in solid lines) and the oval contour 9 (in broken lines) is under compression throughout its thickness. The contour 9 is obviously intended only for purposes of illustration, since its precise position depends on the various conditions.

The two groups of divergent arrows in broken line indicate that the central layer of the glass in zones 2 and 3 which is near the internal boundaries $a_1b_1$ and $c_1d_1$ is placed under tension by the process constituting the invention, the upper and lower surfaces in this area being compressed as a result of the high temper of zones 2 and 3.

The state of compression throughout the thickness of the entire peripheral portion of the transverse strip makes it into a transverse barrier, that is to say, gives it the property of stopping cracks which spread through either of the two highly tempered zones 2 and 3 by means of the middle layer which is under tension. It should be emphasized that there is no pathway under tension parallel to the edges, connecting the layers of the two highly tempered zones which are under tension. This peripheral portion is shown in Figure 2 as the space between the dotted line and the rectangle $a_1$—$b_1$—$c_1$—$d_1$. This is the fundamentally new result obtained by the process constituting the invention.

On Figure 3 the center of the cracks F, created by a shock, gives rise to the usual fragmentation of the highly tempered zone.

All of the cracks are stopped in the immediate neighborhood of the boundary $c_1d_1$ as indicated in the drawing.

In Figure 4 the sheet is shown suspended from the usual articulated pincers 10 in a vertical position for heating before tempering.

The transverse barrier is created by interposing two types of screens:

(a) The end screens 11 of ordinary steel, which are put in place by means of vertical rods 12 which are welded to them.

(b) The screens 13 of ordinary steel which are used to moderate the heating of the body of the barrier strip and which are put in place by means of vertical rods 14 welded thereto.

The screens 11 are positioned so as to straddle the side edges of the sheet at the ends of the barrier strip and project slightly over the screens 13.

The two screens 11 are separate from the two screens 13. These two groups of screens may be put in place simultaneously or separately and consequently serve as regulatory means.

Another method of regulation consists in varying the respective thicknesses of the two types of screens.

In order to prevent the screens from coming in contact with the glass at the moment when they are being put in place, it is advisable to cover the surfaces facing the glass with a thin layer of material which is a poor conductor of heat, such as asbestos paper or asbestos board.

In Figures 5 and 5a the compound screen 15 is carried by a vertical rod 16 by means of which it is placed in a vertical position halfway encircling the glass sheet 1. The ends 17 are coated on the surface facing the sheet 1 with an insulating layer 18 of asbestos.

A similar compound screen 15 is positioned on the opposite side of the sheet 1, as shown in Figure 5a.

In order to reduce the temperature of the end of the barrier strip as compared with that of its body, the metal is thicker at the ends 17 of the screen than at the middle part 19.

It should be remembered that this difference between the temperatures of the ends and of the body of the barrier strip places the ends of the strip under compression parallel to its edges.

In Figure 6 the ends 17 of the compound screen are distinctly larger than its middle part 19. This arrangement provides a margin of safety when the ends of the barrier strip are placed under compression, and thus increases the protection afforded against the extension of cracks along the edges of the sheet.

In Figures 7 and 7a the compound screen has enlarged ends and carries two small bars 20 at the longitudinal edges of its middle portion which create a ridge of greater thickness therealong.

These ridges help to obtain a greater degree of compression in the barrier strip along the boundaries between it and the two highly tempered zones 2 and 3.

In Figure 8 the middle part of the screen is lined with a layer of asbestos board 21 which accentuates the moderating effect of the middle part 19.

In Figures 9 and 9a the U-shaped compound screen 22 straddles the left edge of the sheet 1 and covers one end, plus a little more than half of the body of the barrier strip, since the ends 24 of the arms 23 are beveled and are adapted to fit against the ends 24' of the arms 23' of the similar screen which straddles the right-hand edge (not shown) of the sheet 1.

The compound screen 22 is made of ordinary steel. It carries a head 25 which curves around the edge of the sheet and its surface on the side facing the sheet is lined with an asbestos insulating layer 26.

The screen is supported by two flat iron strips 27, each having at its lower end a flange 28 which is welded to the head 25.

In Figure 10 the windshield 29 is shown inside an electric furnace 30 in which it is heated before tempering and is shown in the last phase of heating, that is to say, during the phase in which the screens for the barrier strip are in place. The windshield is suspended from two articulated pincers 10 attached to the horizontal arm 31 of a flat T-shaped iron member.

The vertical arm 32 of the T-shaped member is attached through a yoke to conventional suspension means (not shown), when the furnace 30 is a furnace of the discontinuous type. This vertical arm is mounted between the side flanges of a horizontally moving carriage (not shown) when the furnace 30 is of the continuous type.

The middle part of the windshield is encircled by the compound screens 15 having enlarged ends 17 of the type shown on Figure 6. These screens are brought into position at the proper time by means of the vertical rods 16 which are welded to their upper ends.

When the two large zones of the windshield which are not covered by the screens have reached the proper degree of viscosity for a high temper, the assembly comprising the windshield and the suspending means is drawn out of the furnace and brought between two convection coolers of the usual type (not shown) at which point the treatment hereinbefore described is carried out.

In Figure 11 the windshield 29, suspended from the horizontal arm 31 of the flat iron T-shaped member, is about to be encircled by the two compound screens 22 which have been lowered by means of the rods 27 to the proper height in the furnace in which it is heated before tempering. These two screens will be moved along the lines indicated by the arrows in order to occupy the positions shown by the dotted lines during the tempering process.

In Figure 12 the windshield 29, in which a transverse barrier has been produced along its transverse axis, has received a shock which created a center F of cracks in the right-hand highly tempered zone 32. This zone cracks along the lines schematically indicated in the figure, but the cracks are stopped at the left by the transverse barrier and a zone 33 offering unimpaired visibility remains.

In Figure 13 the windshield 29', which has two transverse barriers, retains two zones of unimpaired visibility 34 and 35 after fragmentation of the central zone 36 beginning at the center point F.

In Figure 14 the windshield 29" has a longitudinal transverse barrier. If a center F for cracks is created in the lower zone 37, this zone will be fragmented as indicated in the figure and the driver of the vehicle will still be able to see through the zone 38 since its visibility has not been impaired.

I claim:

1. The process of producing in a glass sheet a plurality of highly tempered zones, completely separated one from another by a barrier strip of less highly tempered glass extending from one side edge of the sheet to the opposite side edge and adapted to prevent cracks originating in either of said zones from spreading outside thereof, particularly into the portions at the ends of the barrier strip extending along the side edges of the sheet, which process comprises the steps of first differentially heating said sheet until the viscosity of the glass in the body portion of the barrier strip is higher than that of the glass in the zones separated by said strip and lower than that of the glass in the side edge portions at the ends of said strip, said differential heating being continued until the viscosity of the glass in the side edge portions at the ends of said barrier strip is lower than $10^{13}$ poises, and until the viscosity in said separated zones is such that rapid cooling thereof results in a high temper, and then rapidly cooling the portions of the sheet to be highly tempered while cooling the side edge and body portions of said barrier strip enough to temper the entire thickness of the glass therein.

2. The process claimed in claim 1, wherein the edge portions of the barrier strip extending along the transverse boundaries thereof separating the barrier strip from the highly tempered zones of the finished sheet are subjected to the same differential heating and cooling as the side edge portions of the barrier strip.

3. The process of producing in a glass sheet a plurality of highly tempered zones, completely separated one from another by a transverse barrier strip of less highly tempered glass extending from one side of the sheet to the opposite side and adapted to prevent cracks originating in either of said zones from spreading outside thereof, particularly into both end portions of the barrier strip extending along the side edges of the sheet, which process comprises the steps of first heating the entire sheet, bringing the temperatures of the body and end portions comprised in said barrier strip to a point lower than that of the separated zones, the temperature of said end portions being lower than that of said body portion and the viscosity of said end portions being lower than $10^{13}$ poises, and the viscosity of said separated zones being such that rapid cooling thereof results in a high temper, and then cooling the entire sheet rapidly.

4. The process claimed in claim 3 in which the increase in temperature of said barrier strip is limited by shielding it against heat while the sheet as a whole is still being heated and the end portions of said barrier strip are shielded for a longer time than said body portion.

5. The process claimed in claim 3 in which the increase in temperature of said barrier strip is limited by shielding it against heat while the sheet as a whole is still being heated and said shielding step is applied more effectively to the end portions of said barrier strip than to the body portion thereof, thereby reducing the heat transferred to said barrier strip ends to a greater extent than it reduces the heat transferred to said barrier strip body.

References Cited in the file of this patent

UNITED STATES PATENTS

| | | |
|---|---|---|
| 1,943,995 | Weld | Jan. 16, 1934 |
| 2,160,065 | Ford | May 30, 1939 |
| 2,177,324 | Long | Oct. 24, 1939 |
| 2,177,336 | Shaver et al. | Oct. 24, 1939 |
| 2,244,715 | Long | June 10, 1941 |
| 2,251,160 | Owen | July 29, 1941 |
| 2,388,808 | White | Nov. 13, 1945 |
| 2,401,442 | Weiks | June 4, 1946 |

FOREIGN PATENTS

| | | |
|---|---|---|
| 826,690 | France | Jan. 12, 1938 |
| 1,038,439 | France | May 6, 1953 |
| 1,063,312 | France | Dec. 16, 1953 |
| 444,317 | Great Britain | Mar. 11, 1936 |
| 606,756 | Great Britain | Aug. 19, 1948 |
| 704,312 | Great Britain | Feb. 17, 1954 |
| 726,626 | Great Britain | Mar. 23, 1955 |
| 358,407 | Italy | Apr. 14, 1938 |